July 21, 1953
J. H. BENDER ET AL
2,645,860
WHEEL TESTING DEVICE
Filed Aug. 31, 1946
2 Sheets-Sheet 1
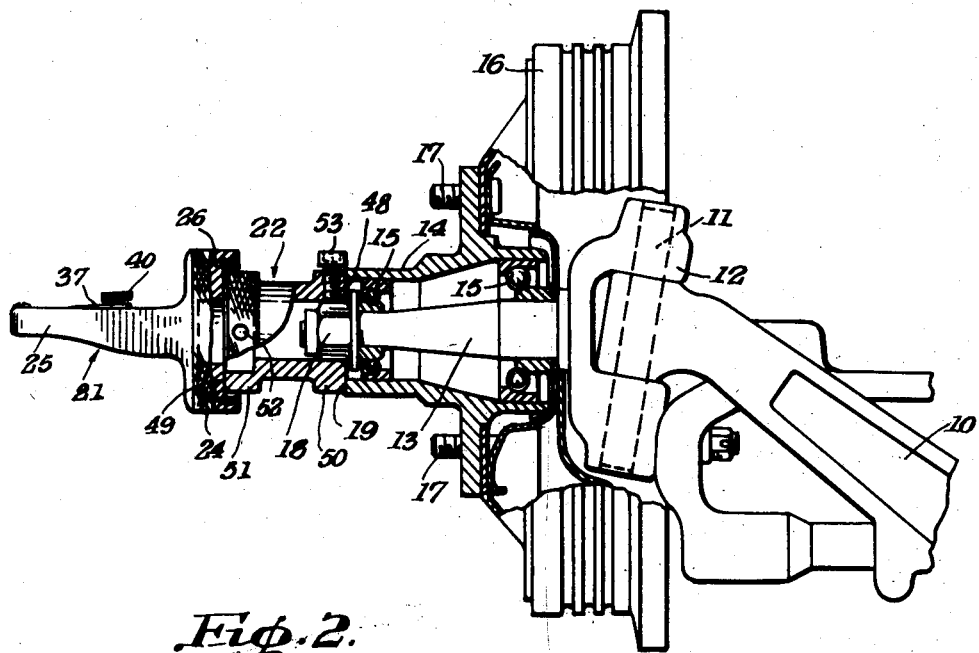
*Fig. 1.*
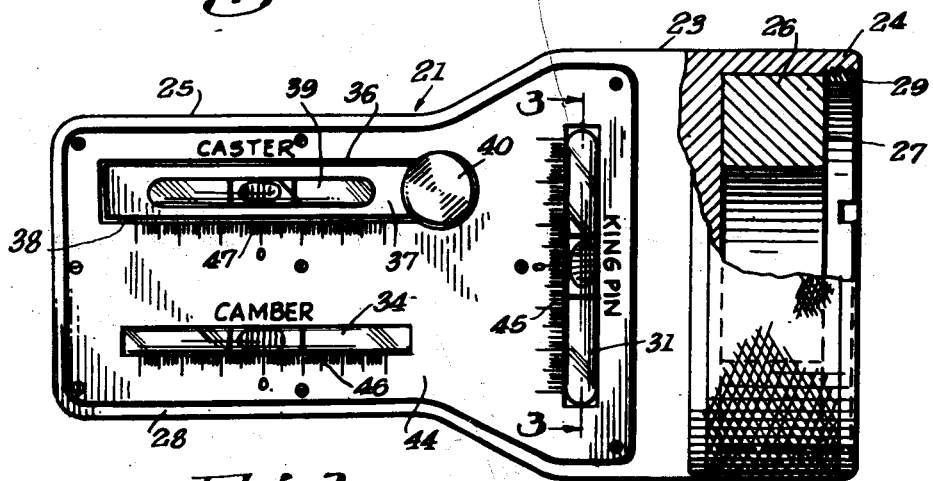
*Fig. 2.*
*Fig. 3.*
J. H. BENDER
DONALD H. SHOOTER
INVENTORS.
BY C. G. Stratton
ATTORNEY.

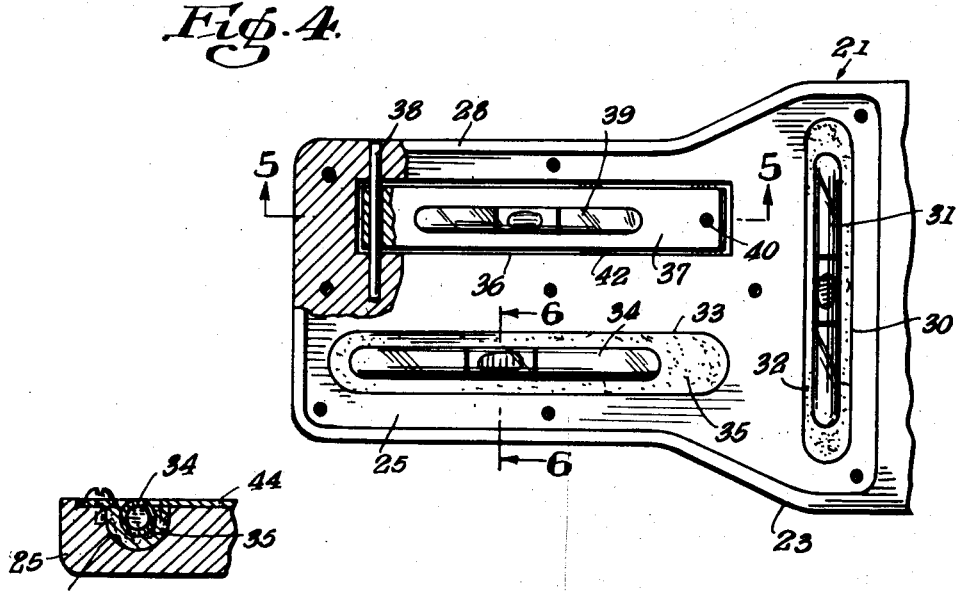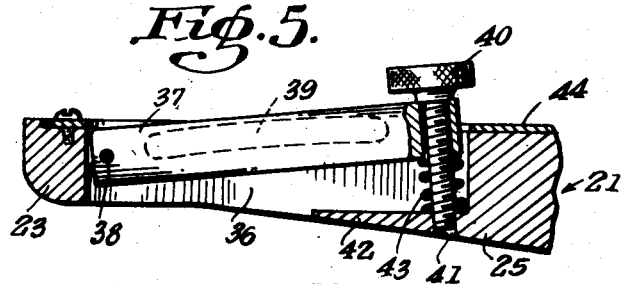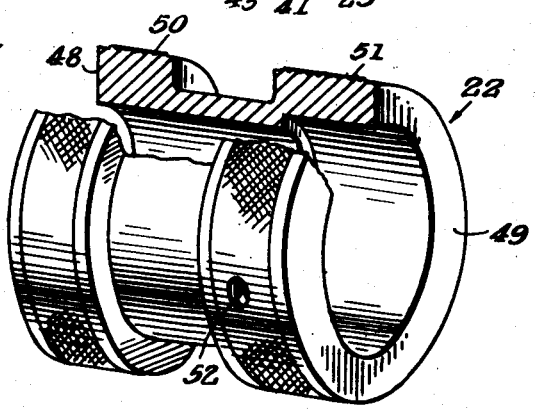

Patented July 21, 1953

2,645,860

UNITED STATES PATENT OFFICE 2,645,860

WHEEL TESTING DEVICE

John H. Bender and Donald H. Shooter,
Maywood, Calif.

Application August 31, 1946, Serial No. 694,176

9 Claims. (Cl. 33—203.18)

This invention relates to means for measuring the alignment and disposition of vehicle wheels, the invention being more particularly directed to provide a gauge for measuring the camber, caster, and kingpin inclination of the wheels of automotive vehicles.

Camber, in an automotive vehicle wheel, is that amount in inches or degrees that each wheel is tilted outward at the top. Caster is the amount in degrees of the backward tilt of the axle and kingpin. Kingpin inclination is the amount in degrees that the tops of the kingpins are inclined toward the center of the vehicle.

The primary object of the invention is to provide a simple and effective gauge for obtaining readings in degrees of the camber, caster and kingpin inclination of a vehicle wheel.

Another object of the invention is to provide a gauge of the character indicated which embodies magnetic means for facilitating the application of the gauge to a wheel hub whereby the mentioned gauging operations are readily accomplished.

Another object of the invention is to provide means embodying the mentioned gauge and an adapter for effecting mounting of the gauge on the spindle of the wheel being tested to obtain caster and kingpin inclination readings directly from the spindle, said gauge being directly applicable to the wheel hub for camber readings.

Our invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes one embodiment of the present invention, which is given by way of illustration or example only.

In the drawings, like reference characters designate similar parts in the several views.

Fig. 1 is a sectional view, partly in elevation, of a conventional front wheel axle assembly, showing the gauge mounted thereon for caster and kingpin checking.

Fig. 2 is an enlarged plan view, partly broken, of the gauge.

Fig. 3 is a fragmentary cross-sectional view as taken on the line 3—3 of Fig. 2.

Fig. 4 is a framentary top view of the gauge with its top cover plate removed.

Figs. 5 and 6 are fragmentary sectional views as taken on the respective lines 5—5 and 6—6 of Fig. 4.

Fig. 7 is a perspective view, partly broken away, of the adapter.

Fig. 8 is a broken side view, in partial section, showing the gauge as applied directly to the wheel hub for camber checking.

As shown in Fig. 1, a conventional front axle assembly comprises an axle I-beam 10 carrying at its end a kingpin 11 which extends outwardly up and down from said beam end. The extending ends of the kingpin are rotationally engaged by a steering knuckle 12 integrally formed with a wheel spindle 13. A wheel hub 14 is mounted by means of anti-friction bearings 15 on the spindle 13. The wheel hub 14 mounts a brake drum 16 and carries studs 17 by means of which a wheel is mounted on the hub. The axle assembly, conventionally, is provided with a nut 18 which locks the hub 14 to the axle 13, said nut also conventionally, protruding from the outer end 19 of the hub. The latter end is in the form of a machined transverse face normal to the spindle axis.

According to the invention, the gauging means comprises, generally, a gauge 21 and an adapter 22. The former is adapted to be directly applied, as in Fig. 8, to the end 19 of the wheel hub 14 and, together with the latter, is adapted to be applied, as in Fig. 1, to said end 19.

The gauge 21 comprises a unitary member having a body 23 formed with a tubular end 24 and a flat reduced end 25. The tubular end 24 houses a permanent magnet formed to be ring-shaped and having an outer face 27 which is normal to the top face 28 of the gauge end 25. A threaded ring 29 serves to lock the magnet ring 26 in place.

The end 25 of the gauge body 23 is transversely recessed as at 30 for a spirit level 31 fixedly held in a suitable cementitious bed 32 in said recess or cavity. Similarly, the body 23 is laterally and longitudinally recessed at 33 for a spirit level 34 fixedly held in a cementitious bed 35. Parallel to and generally symmetrical with the recess 33, the body end 25 is formed with a recess or slot 36 in which is disposed a member 37, mounted on a pivot pin 38, to be tilted in the longitudinal dimension of the gauge body. The member 37 has embodied therein a spirit level 39. Adjustment of the spirit level 39 is effected about the pin 38 by means of an adjusting screw 40 passing through the free end of the member 37 and threadedly engaged in a seat 41 formed in a lip 42 of the gauge body. A coil compression spring 43, around the screw 40 and between said lip and the bottom of the member 37, provides sufficient friction between the parts to maintain an adjusted position until disturbed by manipulation of the head of the screw 40. A suitably slotted plate 44 covers the top face 28 of the gauge body, the slots being arranged to expose the spirit levels 31, 34 and 39, as best seen in Fig. 1. One edge of each slot is suitably calibrated, preferably in angular degrees, as shown at 45, 46 and 47, for the respective levels 31, 34 and 39.

The adapter 22 is preferably ferrous or of a material capable of being magnetically attracted. As shown, the adapter is generally tubular having an end face 48 adapted to engage against the end face 19 of the wheel hub and an end face 49 designed for direct contact with the face 27 of the magnet 26. The tubular form of the adapter provides for a clearance fit for the nut 18 of the spindle 13. The ends 50 and 51 of the adapter are somewhat enlarged to form annular flanges which may have knurled peripheral surfaces. A radial tapped hole 52 extends through each flange 50 and 51 for a set screw 53 selectively employed, in the holes 52, to engage the nut 18.

In operation, to check camber, the gauge is mounted on the hub 14 by the magnetic attraction of the faces 19 and 27. The camber angle can be read directly from the position of the bubble or level 34 with relation to the scale calibrations 46. To check caster, the adapter 22 is firts mounted on the hub 14 and locked against nut 18. The gauge 21 is then mounted on the adapter by means of the magnetic attraction between faces 49 and 27. The bubble of spirit level 29 is then adjusted to zero by manipulation of screw 40. Then, by turning the wheel on its kingpin 11 through an included angle of 40°, and checking the readings obtained from the calibrations 47 against factory or established specifications, the caster angle of the wheel can be determined. With the parts in the latter position, three readings of calibrations 45, through a range of 40°, can be made to check the kingpin inclination.

It will be noted that the outer face 27 of magnet 26 is shown as having a substantially larger diametral size than the outer end face 19 of wheel hub 14 and also the end face 49 of adapter 22. Consequently, in the application and use of the gauge, the same, while held magnetically on hub 14 or adapter 22, as the case may be, is adapted to be rotated relative to the hub or adapter and also slid relative thereto. Such rotational and sliding adjustability of the gauge and the body thereof facilitates accuracy of application and use, enabling proper operative association of the spirit levels carried by the gauge body. While the permanent magnet shown is preferred, a gauge structure embodying an electro-magnet would function in a suitable manner.

While we have illustrated and described what we now regard as the preferred embodiment of our invention, the construction is, of course, subject to modifications without departing from the spirit and scope of our invention. We, therefore, do not wish to retrict ourselves to the particular form of construction illustrated and described, but desire to avail ourselves of all modifications that may fall within the scope of the appended claims.

It is to be understood that this device may be employed on all types of axles, either front or rear, or on wheel suspension units.

Having thus described our invention, what we claim and desire to secure by Letters Patent is:

1. A wheel checking gauge comprising a body formed with a tubular end and with a flat end extending longitudinally therefrom, a magnet housed in the tubular end and having an exposed face whereby the body is adapted to be mounted magnetically in operative position, a transverse spirit level mounted in the flat end of the body for guiding leveling of the body in operative position, and a pair of generally co-extensive longitudinally disposed spirit levels also mounted in said flat end and responsive to indicate tilt of the body after leveling thereof.

2. A wheel checking gauge comprising a body formed with a tubular end and with a flat end extending longitudinally therefrom, a magnet housed in the tubular end and having an exposed face whereby the body is adapted to be mounted magnetically in operative position, a transverse spirit level mounted in the flat end of the body for guiding leveling of the body in operative position, and a pair of generally co-extensive longitudinally disposed spirit levels also mounted in said flat end and responsive to indicate tilt of the body after leveling thereof, one of the latter levels being adjustable with respect to the other.

3. In a wheel checking gauge, a body having a generally flat portion, a pair of fixed spirit levels arranged in said portion and parallel to the plane thereof, one level being transverse to the other, an adjustable spirit level mounted in said flat body portion and arranged parallel to one of the other spirit levels, and magnetic means for mounting the gauge in operative position, said means comprising a circular permanent magnet having a face normal to the plane of the mentioned flat portion of the body and the fixed spirit levels.

4. A wheel checking gauge for operative association with the outwardly directed face of the hub of a wheel, said gauge comprising a body having a cylindrically tubular end formed with an outwardly open seat, a permanent magnet residing within said seat and having an outwardly facing surface for magnetic engagement with the mentioned face of the wheel hub whereby said body is held connected to the wheel hub and is adapted for rotation relative thereto, an extension on the body on the end thereof opposite to the magnet seat, said extension having an upper face that is parallel to the axis of the tubular end, and a plurality of spirit levels mounted on said extension and arranged parallel to the upper face thereof, one of said spirit levels being adjustable relative to the others.

5. A wheel checking gauge for operative association with the outwardly directed face of the hub of a wheel, said gauge comprising a body having a cylindrically tubular end formed with an outwardly open seat, a permanent magnet residing within said seat and having an outwardly facing surface for magnetic engagement with the mentioned face of the wheel hub whereby said body is held connected to the wheel hub and is adapted for rotation relative thereto, an extension on the body on the end thereof opposite to the magnet seat, said extension having an upper face that is parallel to the axis of the tubular end, a spirit level mounted on said extension and arranged transversely thereof and parallel thereto, two additional spirit levels on said extension and arranged longitudinally thereof, and means to adjust one of the latter spirit levels for relative angular disposition with respect to the upper face of the extension, said spirit levels being operatively associated whereby the latter two are read after the spirit bubble of the transverse level is first centered.

6. The combination with the accurately machined outwardly directed annular face of the hub of a kingpin-mounted wheel, of a gauge for reading kingpin inclination as well as camber and caster of the wheel, said gauge comprising a body terminating in an end face adapted to be directed toward said annular face of the hub, a kingpin inclination-indicating level carried by said body, and permanent magnet means mounted on said end face and having an outer face for magnetic engagement with said annular face of the wheel hub, the mentioned level being arranged in a horizontal plane and along a line parallel to said outer magnet face, said magnet means having spaced upper and lower portions residing in a vertical plane that extends through the middle of the mentioned level and said spaced portions having magnetic engagement with spaced portions of said wheel hub face, whereby the gauge is slidably and rotatably mounted on the hub to enable adjustment thereof during the reading aforementioned.

7. A wheel checking gauge for operative association with the outwardly directed face of the hub of a wheel, said gauge comprising a body, a permanent magnet mounted on the inner end of said body and having an outwardly facing surface for magnetic engagement with the aforementioned face of the wheel hub, whereby said body is held connected to the wheel hub and is adapted for rotation relative thereto, an extension on the outer end of the body, said extension having an upper face that is substantially parallel to the longitudinal axis of the body, a spirit level mounted on said extension and arranged transversely thereof and parallel thereto, two additional spirit levels on said extension arranged longitudinally thereof, said spirit levels being operatively associated whereby the last two mentioned spirit levels are read after the spirit bubble of the transverse spirit level is first centered.

8. A wheel checking gauge for operative association with the outwardly directed face of the hub of a wheel, said gauge comprising a body, a permanent magnet mounted on the inner end of said body and having an outwardly facing surface for magnetic engagement with the aforementioned face of the wheel hub, whereby said body is held connected to the wheel hub and is adapted for rotation relative thereto, an extension on the outer end of the body, said extension having an upper face that is substantially parallel to the longitudinal axis of the body, a spirit level mounted on said extension and arranged transversely thereof and parallel thereto, two additional spirit levels on said extension arranged longitudinally thereof, said spirit levels being operatively associated whereby the last two mentioned spirit levels are read after the spirit bubble of the transverse spirit level is first centered, and means to adjust one of the longitudinally disposed spirit levels for relative angular disposition with respect to the upper face of the extension.

9. The combination with a spindle-mounted wheel having a hub provided with an outer end face that is machined normal to the axis of said spindle, of a wheel-gauging device comprising a gauge-mounting body and a magnet fixedly mounted in said body and having at least one annular and flat end pole face, said latter face magnetically engaging said end face of the wheel hub to secure said gauging device to the wheel and thereby supporting said gauging device in its entirety from the hub.

JOHN H. BENDER.
DONALD H. SHOOTER.

References Cited in the file of this patent

UNITED STATES PATENTS

| Number | Name | Date |
| --- | --- | --- |
| 1,622,342 | Prather | Mar. 29, 1927 |
| 1,783,541 | Hogg et al. | Dec. 2, 1930 |
| 1,932,143 | Piercy | Oct. 24, 1933 |
| 2,032,399 | Button | Mar. 3, 1936 |
| 2,115,347 | Sutton | Apr. 26, 1938 |
| 2,176,357 | Palmer | Oct. 17, 1939 |
| 2,177,669 | Martin | Oct. 31, 1939 |
| 2,285,965 | Halstead | June 9, 1942 |
| 2,292,968 | Peters | Aug. 11, 1942 |
| 2,308,808 | Graham | Jan. 19, 1943 |
| 2,438,358 | Castiglia | Mar. 23, 1948 |